(12) United States Patent
Richter et al.

(10) Patent No.: US 12,351,127 B2
(45) Date of Patent: Jul. 8, 2025

(54) METHOD OF OPERATING LOCKING DEVICES OF AT LEAST TWO MOTOR VEHICLES, CONTROL DEVICE, MOTOR VEHICLE-EXTERNAL SERVER DEVICE, PORTABLE KEY DEVICE, MOTOR VEHICLE, AND SYSTEM FOR OPERATING LOCKING DEVICES OF TWO MOTOR VEHICLES

(71) Applicants: CARIAD SE, Wolfsburg (DE); Volkswagen Aktiengesellschaft, Wolfsburg (DE)

(72) Inventors: Robin Richter, Gifhorn (DE); Sebastian Ehmann, Wolfenbüttel (DE)

(*) Notice: Subject to any disclaimer, the term of this patent is extended or adjusted under 35 U.S.C. 154(b) by 278 days.

(21) Appl. No.: 18/182,189

(22) Filed: Mar. 10, 2023

(65) Prior Publication Data

US 2023/0294637 A1 Sep. 21, 2023

(30) Foreign Application Priority Data

Mar. 17, 2022 (DE) ...................... 10 2022 106 239.2

(51) Int. Cl.
*B60R 25/24* (2013.01)
*B60R 25/10* (2013.01)
*G07C 9/00* (2020.01)

(52) U.S. Cl.
CPC .............. *B60R 25/24* (2013.01); *B60R 25/10* (2013.01); *G07C 9/00309* (2013.01); *G07C 2009/00333* (2013.01); *G07C 2009/00507* (2013.01)

(58) Field of Classification Search
CPC ..... B60R 25/24; B60R 25/10; G07C 9/00309; G07C 2009/00333; G07C 2009/00507
See application file for complete search history.

(56) References Cited

U.S. PATENT DOCUMENTS

| | | | | |
|---|---|---|---|---|
| 2003/0231131 | A1* | 12/2003 | Dimig | B60R 25/209 340/5.72 |
| 2009/0225299 | A1* | 9/2009 | Crawford | G01C 3/08 356/4.07 |
| 2022/0410802 | A1* | 12/2022 | Aladas | B60W 50/16 |

FOREIGN PATENT DOCUMENTS

| | | | |
|---|---|---|---|
| CA | 2214907 A1 * | 4/1999 | ............ B60K 28/00 |
| DE | 102016008468 A1 | 2/2017 | |
| DE | 102019131690 A1 | 5/2021 | |
| WO | 2021/023465 A1 | 2/2021 | |

* cited by examiner

*Primary Examiner* — Nabil H Syed
*Assistant Examiner* — Cal J Eustaquio
(74) *Attorney, Agent, or Firm* — Seed IP Law Group LLP

(57) ABSTRACT

A method performed by a control device includes determining that a portable key device is located in a given reception zone around at least two motor vehicles; determining a physical position of the portable key device in relation to at least one of the motor vehicles; ascertaining, based on the physical position of the portable key device, one of the at least two motor vehicles at which a predetermined reference of the portable key device is pointing; providing a control signal that operates a locking device of the one of the at least two motor vehicles, where the control signal causes at least partial unlocking or at least partial locking of the one of the at least two motor vehicles; and transmitting the control signal to the locking device of the one of the at least two motor vehicles.

11 Claims, 3 Drawing Sheets

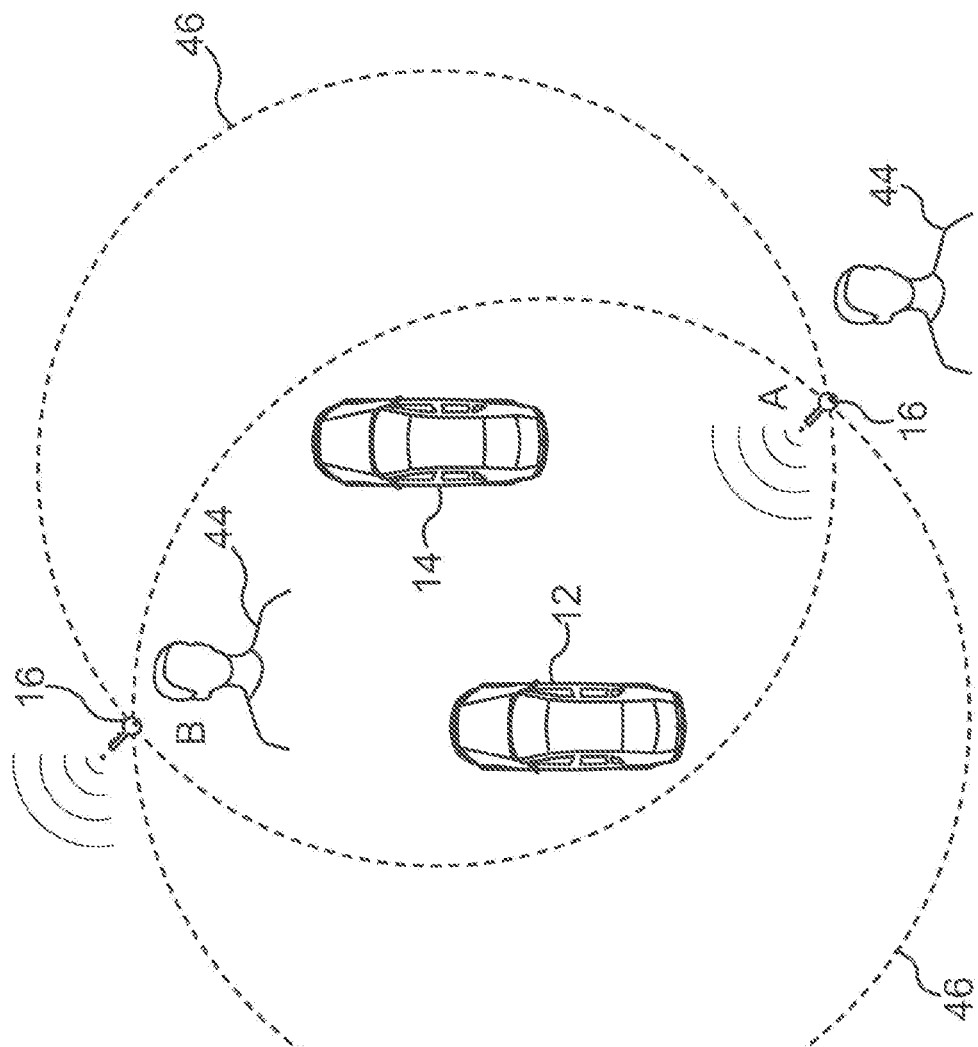

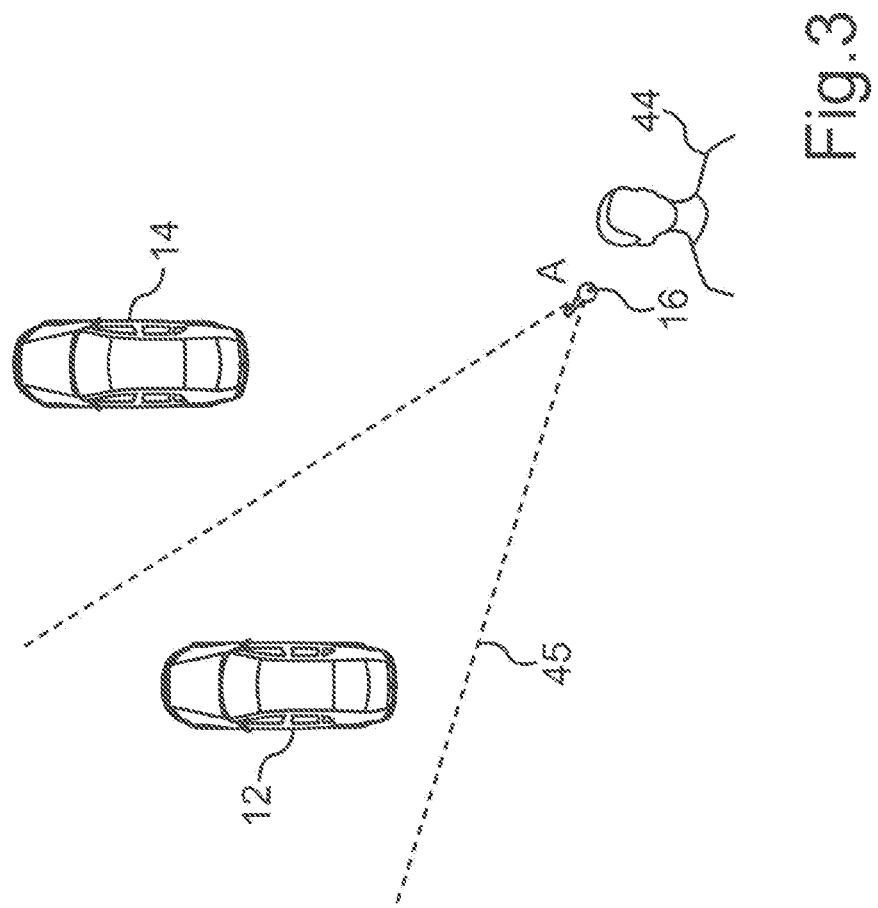

METHOD OF OPERATING LOCKING DEVICES OF AT LEAST TWO MOTOR VEHICLES, CONTROL DEVICE, MOTOR VEHICLE-EXTERNAL SERVER DEVICE, PORTABLE KEY DEVICE, MOTOR VEHICLE, AND SYSTEM FOR OPERATING LOCKING DEVICES OF TWO MOTOR VEHICLES

BACKGROUND

Technical Field

Method of operating locking devices of at least two motor vehicles, control device, motor vehicle-external server device, portable key device, motor vehicle, and system for operating locking devices of two motor vehicles

Description of the Related Art

The present disclosure relates to a method of operating locking devices of at least two motor vehicles. A locking device includes a device, a device group, or a device component with the aid of which a lock or multiple locks of a particular motor vehicle can be locked and unlocked. The locks can be locked or unlocked independently of each other, or they can be switched centrally. In other words, individual doors can be locked and unlocked, or all doors and hoods can be centrally locked and unlocked. The locking device in particular can be designed as the locking system of the respective motor vehicle.

If a user generally has multiple vehicles available (such as a first and a second car), it is desirable for the user to use only a single key for all the vehicles. If the user sends a signal to his vehicles with his radio key, he would like the action (such as the opening of the vehicle) to be carried out only for one vehicle, and not for all vehicles which are registered for the key.

At present, either there are different keys for different vehicles, or no signals can be sent by simple means to a vehicle.

Another system known from the prior art allows a user to register a key card for multiple vehicles. Key material for multiple vehicles can be stored in the key memory of a mobile terminal device (such as a SmartPhone or SmartWatch) suitable for opening the vehicle.

DE 10 2019 131 690 A1 describes a vehicle key for control of a function of a plurality of vehicles. The vehicle key comprises, among other things, a selector switch, which has a plurality of different positions for the selection of a corresponding plurality of different vehicles.

WO 2021/023465 A1 describes a locking system for a motor vehicle of the KeylessEntry/Go type.

From DE 10 2016 008 468 A1 there is known a vehicle key for the use of multiple vehicles, comprising a mechanical switch, a display unit and an input unit for the selection of a vehicle, an interface for connection to a central computer and/or a detection unit for detection of an adjacent vehicle for automatic configuration to the adjacent vehicle.

The variant with the selector switch has the drawback that the key needs to be programmed. If the key has only one selector switch for two different motor vehicles, no third, fourth, or other additional motor vehicle can be activated with it. For a motor vehicle fleet with more than two motor vehicles, the variant with the programmable key is therefore unsuitable. An additional selector switch might have to be retrofitted on the key.

The variant of the KeylessEntry/Go type requires the user to be standing directly next to the particular motor vehicle which he would like to open or close, so that the correct motor vehicle will respond. Furthermore, the key must be programmed again for every new and additional motor vehicle.

BRIEF SUMMARY

One problem on which the present disclosure is based is to provide the option of controlling the locking device of multiple motor vehicles and to improve the sensitivity of the vehicle detection.

The present disclosure is based on the idea that a user of motor vehicles can control which of the motor vehicles is locked and/or unlocked using only a single key, through the pointing or orientation thereof. In other words, the addressing of the signal for the locking and/or unlocking of the motor vehicle, one of the doors or the trunk hood, depends on the pointing of the key, that is, depending on the physical position of the key. The pointing can be determined, for example, in dependence on a longitudinal axis of the key, a compass function of the key, or the orientation of a predetermined target region of the key. The predetermined target region of the key includes a portion of the key, i.e., the portable key device, which serves as a reference for the position. The target region can be, for example, a vertex of the key device or a marking on the portable key device. Preferably, the determination of the orientation can be supplemented by the detection of the distance of the portable key device from the given motor vehicles.

In other words, a single portable key device is provided, i.e., a key used in common for multiple motor vehicles, the signal of which is determined only for one motor vehicle, to which the reference is oriented.

The present disclosure also makes possible in particular a very precise actuation in the situation where multiple vehicles are parked next to and/or in certain proximity to each other, and only one needs to be opened from a certain distance, without this explicitly involving a vehicle selection, for example through a cell phone menu.

There is no need to use different keys for different vehicles, and as many motor vehicles as desired can be controlled with only one key, i.e., with only one portable key device. The method for controlling the different locking devices also works very well if the user is standing exactly between two of his motor vehicles. Thus, the user need not necessarily be standing next to the motor vehicle that he wants to open and/or close. This is especially advantageous when the motor vehicles are parked in a place where the user does not want to simply walk to the motor vehicle that he wants to lock or unlock. Furthermore, there is no need to have to program the key for each additional motor vehicle, since the control device, i.e., the component for controlling the process, need not necessarily be located in the key. The method and the devices of the present disclosure furthermore require separate selector switches for each of the motor vehicles.

The method according to the present disclosure for operating locking devices of at least two motor vehicles associated with a portable key device is carried out by a control device. These motor vehicles are associated with a single portable key device. At least two motor vehicles associated with the portable key device includes those motor vehicles whose locking devices can be controlled by the same control device.

A control device includes a device, a device component, or a device group which is adapted to receive signals, evaluate them, and generate and transmit control signals. For the receiving of signals, the control device can have a corresponding receiver, as well as a transmitter that sends the control signals generated by the control device. The control device can be configured either as a device, a computer program, a control chip, or part of a device, or it can be distributed among different devices, for example. If the control device is distributed within a system, for example on two motor vehicles and a data server, the totality of the individual control components forms the control device.

The control device ascertains that the portable key device is situated in a given reception zone around the two motor vehicles. The reception zone can be given, for example, by a visual region, if for example one of the motor vehicles, some or all of the motor vehicles, and/or the portable key device comprise a camera for detecting the key device, or the motor vehicle or motor vehicles. In addition or alternatively, the reception zone can be established by a range dictated by a radio standard, over which the key device and the motor vehicles can communicate.

The control device ascertains a physical position of the portable key device in relation to at least one of the motor vehicles. A physical position includes the position of the key device within a reference system, and the position can be used to derive the orientation or the pointing of the key device. In order to ascertain the physical position of the portable key device, the reference can be a longitudinal axis of the key device, a reading of a compass of the portable key device, a reading of an inclination sensor of the portable key device, and/or a physical reference of a target region, such as a given vertex point of the key device, which can comprise for example a magnet, a marking, and/or a light source.

Alternatively or additionally, the physical position can be ascertained with the aid of an image of the portable key device, where the image can preferably come from a camera of one of the motor vehicles; and/or with the aid of a light intensity as detected by photo sensors of one or both of the motor vehicles, if the key device comprises one or more light sources. This has major advantages especially in the dark. The key device can then be designed as a flashlight or laser pointer, for example.

With the aid of the ascertained physical position of the portable key device, the control device determines that one of the at least two motor vehicles at which the reference of the portable key device is pointing. Thus, if a longitudinal axis of the key device or a light source of the key device is directed at one of the motor vehicles, which is for example to the right of the user of the portable key device, the motor vehicle to the right of the user will be opened or closed.

The control device provides a control signal for operating the locking device of the given motor vehicle, generating it for example. The control signal so provided causes at least partial unlocking and/or at least partial locking of the ascertained motor vehicle. The signal for the opening and/or closing in the above example is thus specific to the motor vehicle at the right of the user. The control signal so provided can then cause for example controlling of a central locking system such that the given motor vehicle will be opened. Alternatively, the control signal so provided can cause for example opening of a trunk hood. The control device transmits the control signal so provided to the locking device of the ascertained motor vehicle.

The advantages described above will be obtained.

In one advantageous embodiment of the method according to the present disclosure, the control device can receive a key detection signal from a sensor device of at least one of the motor vehicles, while the received key detection signal will cause a signal strength of a given key signal of the portable key device to be detected by the sensor device of the particular motor vehicle.

A sensor device includes a device, a device component, or a device group having at least one sensor for detecting a property of the surroundings. For example, such sensors may comprise one or more cameras, and/or one or more photo sensors, and/or, as in the configuration being discussed here, one or more receivers of a radio signal. If the key signal from the portable key device is for example a radio signal of a given radio standard, the sensor device can accordingly receive and detect this radio signal. The key detection signal which the sensor device transmits to the control device can then describe for example an identification number of the portable key device and/or a light intensity, if the key signal is light, and/or a magnetic intensity, if the key signal is for example the magnetic radiation of a magnet of the key device.

With the aid of the signal strength so detected, the control device can determine the distance of the portable key device from the particular motor vehicle. For this, the control device can determine for example a magnetic intensity, a light intensity or a strength of the radio signal. With the aid of the distance so determined and the ascertained physical position of the portable key device, the control device can determine that one of the two motor vehicles at which the predetermined reference of the portable key device is pointing.

Thanks to the combination of physical position and distance, the determination of that one of the motor vehicles which should be opened and/or closed becomes even more precise. For example, if both motor vehicles detect the light intensity of the light sent out by the key device or the strength of a radio signal of the portable key device, two possible locations can be derived from this, at which the user with the portable key device may be situated. Thus, with the aid of the orientation of the portable key device, it can be precisely determined which motor vehicle the user wishes to activate the locking device thereof. The more motor vehicles involved in the detection of the signal strength, the more precisely the motor vehicle can be located whose locking device the user wishes to control.

In one advantageous modification, the key signal can be a light signal, and the received key detection signal can describe a light intensity detected by the sensor device. The portable key device can accordingly comprise at least one light source. Alternatively or additionally, the key signal can be a radio signal, and the received key detection signal can describe a radio signal strength detected by the sensor device. With such signals, the distance can be determined especially precisely.

In another embodiment of the method according to the present disclosure, the control device can generate an output signal, which can describe an outputting of a light and/or audio signal by a lighting and/or loudspeaker device of the ascertained motor vehicle after the partial unlocking and/or the at least partial locking has occurred. The generated output signal can then be transmitted to the lighting and/or loudspeaker device of the ascertained motor vehicle.

A lighting device includes a device, a device component, or a device group comprising at least one light source having at least one lighting device or means, such as a headlight system and/or an interior lighting. The lighting device is thus a device, a device group or a device component for illuminating the interior of the motor vehicle and/or the outside surroundings. A loudspeaker device includes a device, a device group, or a device component comprising at least one loudspeaker and adapted to putting out an audio signal.

This embodiment of the method according to the present disclosure thus makes it possible for the ascertained motor vehicle to confirm the control of the locking device after the unlocking and/or locking has occurred by light and/or audio signal.

In another embodiment of the method according to the present disclosure, which is very advantageous especially in combination with the preceding embodiment, the control device can receive a cancellation signal from an operator device after the sending of the produced control signal and after the partial unlocking and/or the at least partial locking of the ascertained motor vehicle has occurred, preferably from an operator device of the portable key device.

An operator device includes a device, a device component, or a device group which is adapted, by way of an operator element—such as a button, a switch, or a touch sensitive screen—to receive and thereby detect an operator action of the user. The operator device can preferably be an operator device of the portable key device.

The cancellation signal describes a reversal of the process of the at least partial unlocking and/or the at least partial locking which has occurred. The operator action which the operator device has detected is thus an operator action to reverse the control action which has occurred. In this embodiment, the control device transmits the received cancellation signal to the locking device of the ascertained motor vehicle in order to reverse the unlocking and/or locking once more. The control device once again determines the physical position of the portable key device in relation to each of the given motor vehicles of the system in order to ascertain once again the motor vehicle which is to be controlled.

Thanks to this embodiment of the method according to the present disclosure, a fine tuning can thus be achieved, that is, the control device can learn to better interpret the detected physical position.

Another embodiment of the method according to the present disclosure proposes that the control device can receive an image signal from a sensor device of the portable key device, the received image signal describing an image showing at least one of the motor vehicles. In this embodiment of the method according to the present disclosure, the portable key device thus has a corresponding sensor device with, for example, a camera, an ultraviolet camera, a Time-of-Flight camera, or an infrared camera. The image described by the image signal then describes the motor vehicle which the user wishes to open and/or close. With the aid of the received image signal, the control device ascertains that one of the two motor vehicles at which the predetermined reference of the portable key device is pointing. In other words, the user will point the camera of the key device at the motor vehicle which he would like to open or close.

For this, the portable key device need only have one camera and a further motor vehicle can be added to the system at any time, for example by providing an image of the further motor vehicle to the control device. The determining and ascertaining of the motor vehicle can be done accordingly by image recognition using a customary image recognition software, in which for example the model of the motor vehicle, and/or the color, and/or a license plate or an identification number of the motor vehicle is recognized.

If the image shows multiple motor vehicles associated with the portable key device, the control device can check for different properties in sequence.

In another embodiment of the method according to the present disclosure, the control device can receive an image signal from the sensor device of one of the motor vehicles, wherein the received image signal describes an image showing the portable key device. With the aid of the image signal so received, the control device can ascertain the physical position of the portable key device in relation to at least one of the motor vehicles. The position of the key is thus ascertained with the aid of an image of the key. The same benefits as above are obtained.

Optionally, the control device can additionally ascertain an identification number of the key device with the aid of the image and thus check for an authorization, for example.

The present disclosure also encompasses the control device. The control device can comprise a data processing device or a processor device which is adapted to carry out one embodiment of the method according to the present disclosure. The processor device can have for this purpose at least one microprocessor and/or at least one microcontroller and/or at least one FPGA (Field Programmable Gate Array) and/or at least one DSP (Digital Signal Processor). Furthermore, the processor device can comprise a program code which is adapted, when executed by the processor device, to carry out the embodiment of the method according to the present disclosure. The program code can be saved in a data storage of the processor device. The control device can preferably be configured as a control device, a control chip, a controller, a computer, or an application program (App).

The problem stated above is solved by a storage medium having a program code which is adapted, when executed by a processor device, preferably a processor device of a mobile terminal device, to cause the control device to carry out one embodiment of the above described method. The storage medium can be configured for example as a memory card or memory chip or other data storage. A processor device includes a device or a device component for electronic data processing. The processor device can comprise, for example, at least one microcontroller and/or at least one microprocessor. The benefits already mentioned will be obtained.

The problem stated above is solved by a mobile, portable terminal device, such as a smartphone or a laptop or a tablet PC, with one embodiment of the storage medium according to the present disclosure, and/or with one embodiment of the control device according to the present disclosure. The benefits described above will be obtained.

The problem stated above is solved by a motor vehicle-external server device for operation in the Internet, such as a data server, a backend and/or a data cloud, wherein the server device comprises one embodiment of the storage medium according to the present disclosure, and/or one embodiment of the control device according to the present disclosure.

The problem stated above is likewise solved by a portable key device for the operation of at least two motor vehicles associated with the key device, wherein the key device comprises an embodiment of the control device according to the present disclosure. In other words, the portable key device is adapted to determine its own physical position. The benefits described above will be obtained.

The problem stated above is likewise solved by a motor vehicle comprising one embodiment of the control device according to the present disclosure. The motor vehicle is preferably configured as a passenger car, or as a personal bus or a motorcycle. The physical position of the key device can thus be determined here at the motor vehicle side.

The problem stated above is solved by a system for operating the locking devices of at least two motor vehicles. The system comprises the portable key device and the at least two motor vehicles associated with the key device. Furthermore, the system comprises one embodiment of the control device according to the present disclosure. The control device can be a component of the key device or of one of the motor vehicles. Alternatively, the control device can be divided upon among multiple components, for example, the motor vehicle and the key device. The tasks, that is, the controlling of the locking devices, can thus be distributed among the different components of the system. Optionally, the system can also comprise a motor vehicle-external server device, which comprises one embodiment of the control device according to the present disclosure.

The present disclosure also includes modifications of the control device according to the present disclosure, the motor vehicle-external server device according to the present disclosure, the portable key device according to the present disclosure, the motor vehicle according to the present disclosure and the system according to the present disclosure, having features as already described in connection with the modifications of the method according to the present disclosure. For this reason, the corresponding modifications of the control device according to the present disclosure, the motor vehicle-external server device according to the present disclosure, the portable key device according to the present disclosure, the motor vehicle according to the present disclosure and the system according to the present disclosure are not further described here.

The methods described in the exemplary embodiments can be used for every kind of device with commonly used radio keys. The present disclosure also encompasses the method for controlling such devices, and the devices with one embodiment of the control device according to the present disclosure.

The present disclosure also encompasses the combinations of the features of the described embodiments.

BRIEF DESCRIPTION OF THE SEVERAL VIEWS OF THE DRAWINGS

In the following, exemplary embodiments of the present disclosure shall be described. There are shown:

FIG. 2 shows a schematic diagram of a method, devices, and a system according to a second exemplary embodiment of the present disclosure; and FIG. 3 shows a schematic diagram of a method, devices, and a system according to a third exemplary embodiment of the present disclosure.

DETAILED DESCRIPTION

Figure 1:
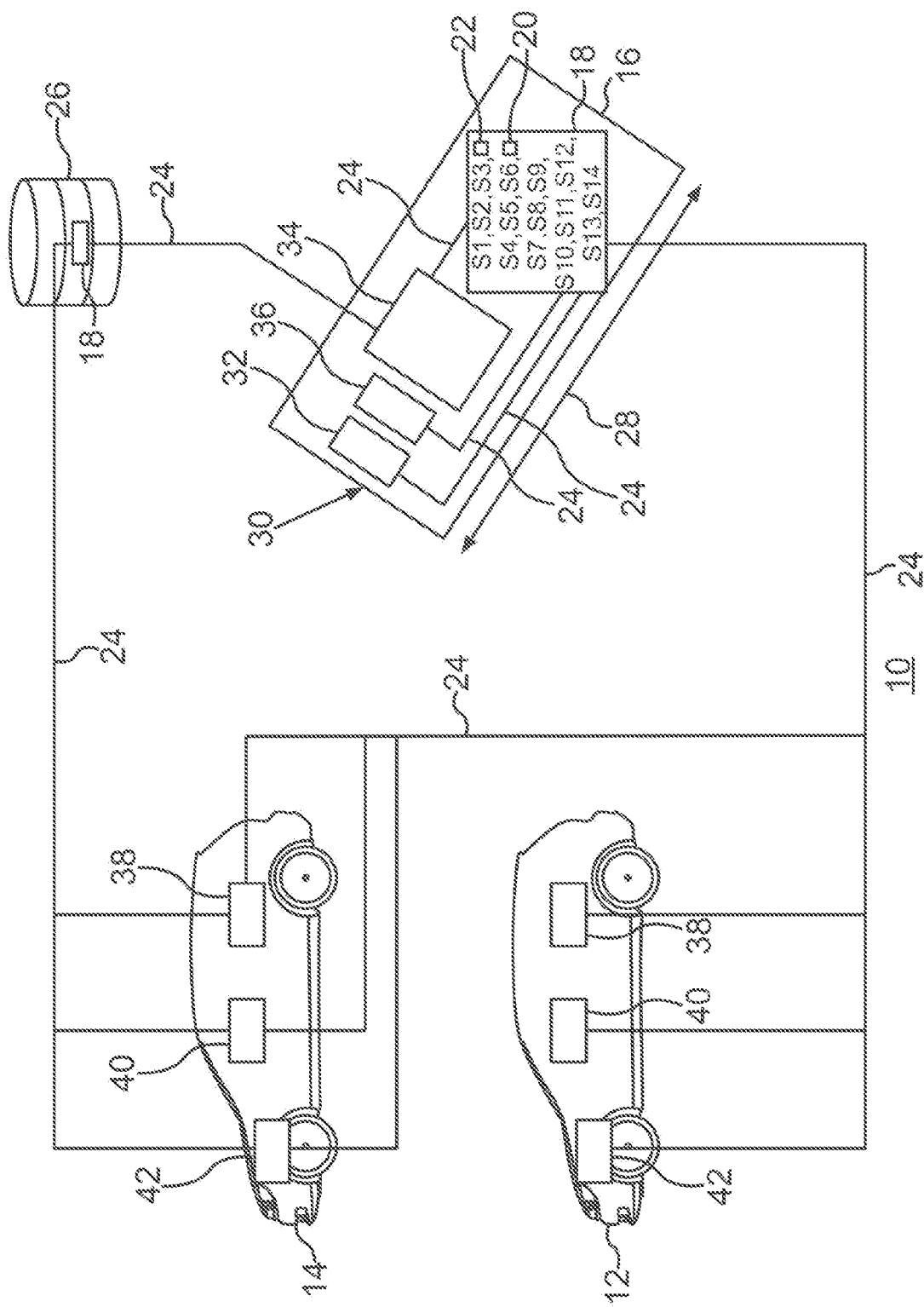
FIG. 1 shows a schematic diagram of a method, devices, and a system according to a first exemplary embodiment of the present disclosure.

The embodiments discussed in the following are particularly advantageous exemplary embodiments of the present disclosure. In the exemplary embodiments, the components each represent individual features of the present disclosure to be viewed independently of each other, which also modify the present disclosure independently of each other and thus should also be viewed as part of the present disclosure, either individually or in other than the combination which is shown. Furthermore, the exemplary embodiments described can also be supplemented with other of the already described features of the present disclosure.

In the figures, functionally identical elements are given the same reference numbers.

FIG. 1 illustrates principle of devices and a method according to a first exemplary embodiment of the present disclosure. For this, FIG. 1 shows a system 10, which may comprise for example two motor vehicles 12, 14, as well as a portable key device 16. The portable key device 16 is shown highly schematized and magnified in order to better represent the individual components and processes. For this, in the example of FIG. 1, the control device 18 is shown for example as a component of the portable key device 16. The motor vehicles 12, 14 can be passenger cars, for example.

The control device 18 can preferably comprise a processor device 20 and/or a data storage device 22 storing instructions that, when executed by the processor device 20, cause the control device 18 to perform the acts described herein. The data storage device 22 can also be called a storage medium, and it can be configured for example as a hard disk, a memory chip or a USB stick. The control device 18 communicates with other components via data communication links 24. These can be either wireline or wireless. Accordingly, the data communication links 24 can be configured for example as a data bus, a Bluetooth connection, or a WIFI connection.

If the control device 18 is a component of a motor vehicle-external server device 26, the data communication links 24 can ideally be mobile radio links, and/or Internet connections. The control device 18 as a component of the server device 26 is shown in the example of FIG. 1 as an alternative to the configuration as a component of the portable key device 16. For better clarity of representation, the data communication links 24 of such a control device 18 of the server device 26 are shown only for the motor vehicle 14, but these data communication links 24 also exist for the motor vehicle 12, and accordingly for the key device 16.

The portable key device 16 can preferably be configured as a one-piece automobile key, for example as a radio key, and the two motor vehicles 12, 14 of the example can be associated with this portable key device 16.

As a reference for determining the position or the orientation of the portable key device 16, it is possible to use for example a longitudinal axis 28 of the key device 16, or a given front end 30, which can also be called the vertex of the key device 16, for example. In FIG. 1, an optional light source 32 of the portable key device 16 is furthermore shown, which can put out light via LEDs, for example. Alternatively, a magnet for example can also be arranged at the front end 30, or there can be a color marking on a housing of the key device 16.

The key device 16 of FIG. 1 furthermore shows an optional operator device 34, which can be designed to receive an operator action and to register it. Optionally, the operator device 34 can then generate an operator signal, which can describe the operator action and/or the function being triggered by the detected operator action, such as the opening of all the doors. A corresponding communication unit of the key device 16 for transmitting such an operator signal is not shown in FIG. 1, for better clarity of representation. The operator device 34 can preferably comprise an operator element for triggering the function, such as a switch, a key, or a touch sensitive screen.

FIG. 1 also shows an optional sensor device 36 of the key device 16, which can preferably encompass one or more cameras.

One or both of the motor vehicles 12, 14 can also preferably comprise a sensor device 38. These also can preferably comprise one or more cameras, such as a top-view camera and/or a rear camera. Preferably, only the key device 16 can have a sensor device 36 with a camera, or one or both of the motor vehicles 12, 14 can have one. The sensor device 38 of one or both of the motor vehicles 12, 14 can also both be ideally configured to receive a radio signal of the portable key device 16, as well as measure a signal strength of the radio signal. Such a radio signal can be a customary radio signal of a radio key, ideally a Keyless-Go system.

Ideally, one of the sensor devices 38 of the motor vehicles 12, 14 or both sensor devices 38 can have one or more sensors for registering and measuring a light intensity, such as ordinary photo sensors.

In the example of FIG. 1, the two locking devices 40 of the motor vehicles 12, 14 are also shown. These involve ordinary locking systems for locking and unlocking the respective motor vehicle 12, 14, where the particular locking device 40 can preferably be configured as a central locking system and can in addition lock and unlock individual doors and the trunk hood separately from each other.

Finally, a lighting and/or loudspeaker device 42 is indicated in FIG. 1 for each of the two motor vehicles 12, 14. In the configuration as a lighting device 42, this comprises a lighting system of the particular motor vehicle 12, 14, i.e., headlights, blinkers, and interior lighting, for example. In the configuration as a loudspeaker device, at least one loudspeaker is present, being preferably oriented to the outdoor surroundings of the motor vehicle.

In the example of FIG. 1, a user (not shown in FIG. 1), i.e., a person carrying the key device 16, is situated in a reception zone (not shown in FIG. 1) and would like to unlock the motor vehicle 14, for example. In the example of FIG. 1 it is assumed that the user is situated closer to the motor vehicle 12. Since both motor vehicles 12, 14 belong to him, for example, the portable key device 16 can be associated with both motor vehicles 12, 14 (or vice versa). This means that the control of the locking devices 40 of both motor vehicles 12, 14 is enabled for the key device 16 shown in FIG. 1.

In a first step S1 of the method, the control device 18 ascertains that the portable key device 16 is situated in the given reception zone. The given reception zone here can be, for example, the reception zone for a radio signal of the key device 16.

In S2, the control device 18 establishes the physical position of the portable key device 16 in relation to one of the two motor vehicles 12, 14, or in relation to both motor vehicles 12, 14.

Different variants are possible for establishing the physical position (S2), although they can also be optionally combined with each other.

In a first variant, the control device 18 can receive a key detection signal from one of the two motor vehicle-external sensor devices 38, preferably from the sensor devices 38 of both motor vehicles 12, 14 (S3). The corresponding sensor device 38 has for example received a radio signal of the portable key device 16 and has detected a corresponding signal strength. The key detection signal generated by this sensor device 38, which is sent from the motor vehicle 12, 14 to the key device 16, can accordingly describe the signal strength of the received radio signal. The control device 18 determines, with the aid of the detected signal strength of the received key detection signal or with the aid of the detected multiple key detection signals, a distance of the portable key device 16, or optionally the respective distance of the key device 16, from the respective motor vehicle 12, 14 (S4). If the sensors of the motor vehicles 12, 14 each comprise photodiodes, the signal whose signal strength is determined (S4) can be the light intensity of a light source 32 of the portable key device 16. The one of the motor vehicles 12, 14 measuring the greater light intensity is the motor vehicle 14 at which the light source 32 of the key device 16 is pointing. By determining the physical position S2 with the aid of the light intensity, the control device 18 can thus determine (S5) that the portable key device 16 is pointing at the motor vehicle 14. In another example, the light source 32 of the key device 16 can beam light with different intensity in four directions, for example, and the photo sensors of the motor vehicle 12 or 14 or those of both motor vehicles 12, 14 can detect and measure the light intensity.

The distance can be determined especially well through the detected signal strength, especially the strength of a radio signal (S4).

In another variant, the control device 18 can receive, for example from one, preferably from both motor vehicles 12, 14, an image signal of a respective camera of the respective motor vehicle 12, 14 (S6) and identify the form of the portable key device 16, for example by pattern recognition (S7). Using a corresponding image recognition software, preferably using a comparison of the images from both motor vehicles 12, 14, the position and thus the orientation of the key device 16 can be deduced (S2). Thus, the key device 16 in one image of the motor vehicle 12 may be shown at a different angle than in the image of the motor vehicle 14. Optionally, the image recognition can also recognize a key marking from the body posture and/or gestures of the user.

In a further variant, if the control device 18 receives in S8 an image from the sensor device 36 of the key device 16, the control device 18 can evaluate the image in S9 and recognize for example the form and the color of the motor vehicle 14. Optionally, in such a pattern recognition, it is also possible to identify the license plate of the motor vehicle 14. In other words, the visual region of the camera, i.e., the image segment, will be evaluated. If the control device 18 determines the motor vehicle 12, 14 sequentially with the aid of the images from the camera of the portable key device 16, it can at first ascertain for example a model of the motor vehicle 12, 14.

Ideally, in the variants with the cameras, the motor vehicle 12, 14 which the user wishes to open can be identified in stages. Thus, an image or images from the sensor device 36 of the key device 16 can at first be evaluated to determine the color of the motor vehicle 14 in the image. If, for example, both motor vehicles 12, 14 are visible in the image, and both motor vehicles 12, 14 are blue, the image can be used to identify a particular model of the motor vehicle 12, 14. If the two motor vehicles 12, 14 are also both of the same model, in a further step the image from the camera of the key device 16 can be evaluated as to whether a license plate can be read for the motor vehicle 14 at which the camera is pointing.

Thus, it can be ideally provided in the system 10 that the control device 18 and the two motor vehicles 12, 14 "chat" with each other. This can be very useful, for example, when comparing the light intensities.

In S10 or S11, the control device 18 provides a control signal, which can describe for example the opening of all motor vehicle doors. For this, the control device 18 can preferably generate the control signal. The providing of the control signal S10 or S11 can occur for example automatically after the orientation of the portable key device 16 has been determined, or only in dependence on a separate operator signal, which can describe the opening process.

As "confirmation" for the user that the opening has occurred, the control device 18 can generate an output signal, for example in S12, which can control the lighting and/or loudspeaker device to put out a light and/or audio signal by the motor vehicle 14. This is sent by the control device 18 in S13 to the motor vehicle 14.

Preferably, a correction mechanism can be provided, in case the user determines that he really did not want to open the motor vehicle 14, or the motor vehicle 12, and that he perhaps did not point the key device 16 properly at the motor vehicle 14. For this, an operator element can be provided for example on the key device 16, upon pressing of which the operator device 34 generates a corresponding cancellation signal and sends it to the control device 18. This receives the cancellation signal. Alternatively, a corresponding operator element can also be provided in one of the motor vehicles 12, 14.

After sending the cancellation signal to the locking device 40 of the motor vehicle 14 (S14), the control device 18 can then carry out once more the method for determining the correct motor vehicle 12.

FIG. 2 shows a method according to a further exemplary embodiment of the present disclosure, while in the following only special features different from the example of FIG. 1 shall be discussed. FIG. 2 focuses on the principle of how to correctly determine the orientation (S2). For this, FIG. 2 shows a situation in which the user 44 has pointed the key device 16 at the motor vehicle 12. The emitting of a radio signal by the key device 16 is shown here in FIG. 2 by the radio wave symbol. The symbol also indicates the direction in which the key device 16 emits the signal in the position held by the user 44. After determining the distance in that both motor vehicles 12, 14 have measured the radio strength, surrounding zones 46 are obtained for each of the motor vehicles 12, 14 in which the key device can be situated on account of the particular measured radio strength. The control device 18 for example can determine in a digital model the two possible locations A, B for the user 44. However, based on the ascertained position of the key device 16, it can only be that the user 44 is situated at location A, that is, the key device 16 is pointing at the motor vehicle 12—unlike the case of FIG. 1.

FIG. 3 shows a further variant, which shall be discussed in the following in terms of the differences with respect to the example of FIG. 1. Unlike FIG. 1, the key device 16 is pointing at the motor vehicle 12. In this variant, the key device 16 has a light source 32, which can be configured for example as a flashlight, and which, as shown in FIG. 3, casts a light cone 45 on the motor vehicle 12 from the location A of the user 44, based on the orientation of the key device 16. In this example, it is quite evident that the sensor device 38 of the motor vehicle 12 measures a distinctly higher light intensity with a photo sensor or with multiple photo sensors than a sensor device 38 of the motor vehicle 14, which does not lie in the light cone in the example of FIG. 3.

On the whole, the examples illustrate how a recognition of the orientation of a portable key device 16, such as an automobile key, can be produced.

A user 44 has a portable key device 16, such as a radio key, for multiple motor vehicles 12, 14. This device has various operator elements for carrying out different actions, such as "open vehicle," "close vehicle," "open trunk hood."

It is provided that the user 44 of the key can control an action to be carried out only for one motor vehicle 12, 14 with the aid of the orientation of the key.

The following solutions are conceivable for recognizing the orientation (S2, S5), and they can optionally be combined with each other. The potential receivers can communicate with each other and exchange information:

Signal Strength and Orientation

The approximate distance to the motor vehicles 12, 14 is determined (S4). In the case of two motor vehicles 12, 14 which are addressed by a key, there will result two possible positions for the user 44. Taking into account the orientation of the key (for example, compass and/or inclination sensor), it can be reckoned which motor vehicle 12, 14 is being addressed by the user 44 (S5).

FIG. 2 shows that the signal strength indicates the approximate distance of the key from the motor vehicle 12, 14 (dotted circle). The circles intersect at two positions A and B. From the orientation of the key, it can be deduced that only position A is possible and only motor vehicle 12 will respond to the signal.

Camera in the Key

A camera is installed in the key. This recognizes which motor vehicle 12, 14 is in the visual region and will receive the signal. A system in the (mechanical) key, such as the control device 18, can now select the necessary (digital) key material for the desired motor vehicle 12, in order to send the desired command over appropriate secured radio communication.

Camera in the Motor Vehicles 12, 14

Cameras (such as Top View/Area View) are installed in many motor vehicles. In the images of these cameras, image processing algorithms can recognize the motor vehicle 12, 14 at which the key is pointing (S5). In this case, a motor vehicle 12, 14 can establish the communication with the key and send it a distinct identification number, so that the key can select the correct parameters (such as a digital key) for the further communication.

Light Intensity

The key emits a light cone 45 (visible/invisible). The intensity of the incoming light is measured at the motor vehicles 12, 14.

FIG. 3 shows that motor vehicle 12 is more strongly detected by the light cone 45 and thus receives the signal of the key.

In the event that a motor vehicle 14 is wrongly selected, this can usually be recognized by the key user through light signals of the wrong vehicle, for example. In such situations, he will usually send a cancellation signal directly (after opening or closing), slightly change the orientation of the key, and again make an attempt to open the correct vehicle. This information can be combined in connection with initial sensors in the key, camera data from the vehicles and possibly known geographical coordinates of the user and the vehicles in order to improve the identification of the vehicle which is in fact desired (for example, when three or more possible vehicles are parked next to each other). In similar situations (for example, repeated pressing of open upon changing orientation of the key), additional sensor data can likewise be used for a better interpretation.

The method described in the exemplary embodiments can be used for every type of device with commonly used radio keys.

German patent application no. 10 2022 106 239.2, filed Mar. 17, 2021, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of operating locking devices of at least two motor vehicles associated with a portable key device, the method performed by a control device and comprising:
   determining that the portable key device is located in a given reception zone around the at least two motor vehicles;
   determining a physical position of the portable key device in relation to at least one of the motor vehicles;
   ascertaining, based on the physical position of the portable key device, one of the at least two motor vehicles at which a predetermined reference of the portable key device is pointing;
   providing a control signal that operates a locking device of the one of the at least two motor vehicles, wherein the control signal causes at least partial unlocking or at least partial locking of the one of the at least two motor vehicles; and
   transmitting the control signal to the locking device of the one of the at least two motor vehicles;
   receiving an image signal from a sensor device of the portable key device, wherein the image signal describes an image of one of the motor vehicles; and determining, based on the image signal, the one of the at least two motor vehicles at which the predetermined reference of the portable key device is pointing.

2. The method according to claim 1, further comprising:
   receiving from a sensor device of the at least one of the motor vehicles a key detection signal, wherein the key detection signal indicates a signal strength of a given key signal of the portable key device as detected by the sensor device of the at least one of the motor vehicles; and
   determining, based on the signal strength, a distance of the portable key device from the at least one of the motor vehicles; and
   determining, based on the distance and the physical position of the portable key device, the one of the at least two motor vehicles at which the predetermined reference of the portable key device is pointing.

3. The method according to claim 2, wherein:
   the given key signal is a light signal, and the key detection signal indicates a light intensity detected by the sensor device; or
   the given key signal is a radio signal, and the key detection signal indicates a radio signal strength detected by the sensor device.

4. The method according to claim 1, further comprising:
   generating an output signal that causes outputting of light or an audio signal by a lighting device or a loudspeaker device of the one of the at least two motor vehicles after the at least partial unlocking or the at least partial locking has occurred; and
   sending the output signal to the lighting device or the loudspeaker device of the one of the at least two motor vehicles.

5. The method according to claim 1, further comprising:
   receiving a cancellation signal from an operator device after the transmitting of the control signal and after the at least partial unlocking or the at least partial locking of the one of the at least two motor vehicles, wherein the cancellation signal causes a reversal of the at least partial unlocking or the at least partial locking;
   transmitting the cancellation signal to the locking device of the one of the at least two motor vehicles; and
   determining the physical position of the portable key device in relation to at least one of the motor vehicles again to ascertain the one of the at least two motor vehicles again.

6. The method according to claim 1, further comprising:
   receiving an image signal from a sensor device of one of the motor vehicles, wherein the image signal describes an image of the portable key device,
   determining, based on the image signal, the physical position of the portable key device in relation to at least one of the motor vehicles.

7. A control device, comprising:
   a processor device; and
      a data storage device storing instructions that, when executed by the processor device, cause the control device to:
      determine that a portable key device is located in a given reception zone around at least two motor vehicles;
      determine a physical position of the portable key device in relation to at least one of the motor vehicles;
      ascertain, based on the physical position of the portable key device, one of the at least two motor vehicles at which a reference of the portable key device is pointing;
      provide a control signal that operates a locking device of the one of the at least two motor vehicles, wherein the control signal causes at least partial unlocking or at least partial locking of the one of the at least two motor vehicles; and
      transmit the control signal to the locking device of the one of the at least two motor vehicles;
      receive an image signal from a sensor device of the portable key device, wherein the image signal describes an image of one of the motor vehicles; and
      determine, based on the image signal, the one of the at least two motor vehicles at which the reference of the portable key device is pointing.

8. The control device according to claim 7, wherein the control device is included in a motor vehicle-external server device.

9. The control device according to claim 7, wherein the control device is included in the portable key device.

10. The control device according to claim 7, wherein the control device is included in one of the motor vehicles.

11. A system comprising:
    a portable key device;
    at least two motor vehicles associated with the portable key device; and
    a control device including a processor device and a data storage device storing instructions
    that, when executed by the processor device, cause the control device to:
    determine that the portable key device is located in a given reception zone around the at least two motor vehicles;
    determine a physical position of the portable key device in relation to at least one of the motor vehicles;
    ascertain, based on the physical position of the portable key device, one of the at least two motor vehicles at which a reference of the portable key device is pointing;
    provide a control signal that operates a locking device of the one of the at least two motor vehicles, wherein the control signal causes at least partial unlocking or at least partial locking of the one of the at least two motor vehicles; and transmit the control signal to the locking device of the one of the at least two motor vehicles;

receive an image signal from a sensor device of one of the motor vehicles, wherein the image signal describes an image of the portable key device; and determine, based on the image signal, the physical position of the portable key device in relation to at least one of the motor vehicles.

* * * * *